United States Patent [19]
Kim

[11] Patent Number: 5,991,064
[45] Date of Patent: Nov. 23, 1999

[54] THIN FILM ACTUATED MIRROR ARRAY AND A METHOD FOR THE MANUFACTURE THEREOF

[75] Inventor: Hwa-Nyeon Kim, Seoul, Rep. of Korea

[73] Assignee: Daewoo Electronics Co., Ltd., Seoul, Rep. of Korea

[21] Appl. No.: 08/879,370

[22] Filed: Jun. 20, 1997

[30] Foreign Application Priority Data

Jun. 29, 1996 [KR] Rep. of Korea ................. 96-26154
Jun. 29, 1996 [KR] Rep. of Korea ................. 96-26155

[51] Int. Cl.$^6$ ................. G02B 26/08; G02B 7/182
[52] U.S. Cl. ................. 359/224; 359/291; 359/292; 359/849; 359/846; 359/872
[58] Field of Search ................. 359/290–292, 359/223, 224, 849, 846, 872

[56] References Cited

U.S. PATENT DOCUMENTS

| | | | |
|---|---|---|---|
| 5,627,673 | 5/1997 | Min | 359/290 |
| 5,636,051 | 6/1997 | Lim | 359/290 |
| 5,636,070 | 6/1997 | Ji et al. | 359/855 |
| 5,757,539 | 5/1998 | Min | 359/290 |

FOREIGN PATENT DOCUMENTS

| | | |
|---|---|---|
| 0 712 020 | 5/1996 | European Pat. Off. . |
| 0712021 | 5/1996 | European Pat. Off. . |
| 0718658 | 6/1996 | European Pat. Off. . |
| 2308460 | 6/1997 | United Kingdom . |

*Primary Examiner*—Georgia Epps
*Assistant Examiner*—Evelyn A. Lester
*Attorney, Agent, or Firm*—Pennie & Edmonds LLP

[57] ABSTRACT

An array of M×N thin film actuated mirrors for use in an optical projection system, the array comprises an active matrix including a substrate and an array of M×N connecting terminals and an array of M×N actuating structures. Each of the actuating mirror structures includes a first thin film electrode, a barrier member, a thin film electrodisplacive member, a second thin film electrode and an elastic member. In order to improve mirror morphology and improve the adhesivity between thin films, the barrier layer is placed on top of the thin film electrodisplacive layer and the top surface of second thin film layer is ion-damaged by using an ion beam, respectively.

14 Claims, 10 Drawing Sheets

THIN FILM ACTUATED MIRROR ARRAY AND A METHOD FOR THE MANUFACTURE THEREOF

FIELD OF THE INVENTION

The present invention relates to an optical projection system; and, more particularly, to an array of M×N thin film actuated mirrors having an increased adhesivity between thin films and an improved mirror morphology, and a method for manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, now U.S. Pat. No. 5,636,070 entitled "THIN FILM ACTUATED MIRROR ARRAY".

The process for manufacturing the array 100 begins with the preparation of an active matrix 10 comprising a substrate 12, an array of M×N transistors (not shown) and an array of M×N connecting terminals 14.

In a subsequent step, there is formed on top of the active matrix 10 a thin film sacrificial layer 24 by using a sputtering or an evaporation method if the thin film sacrificial layer 24 is made of a metal, a chemical vapor deposition (CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots (not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes (not shown), each of the holes extending from top of the elastic layer 30 to top of the connecting terminals 14, by using an etching method; and filling therein with the metal to thereby form the conduit 26, as shown in FIG. 1B.

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric: material, e.g., lead zirconium titanate (PZT), is formed on top of the second thin film layer 40 by using a sputtering method, a CVD method or a Sol-Gel method, as shown in FIG. 1C.

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the thin film sacrificial layer 24 in the supporting layer 20 is exposed, as shown in FIG. 1D. Each of the second thin film electrodes 45 is electrically connected to a corresponding transistor through the conduit 26 formed in each of the supporting members 22 and functions as a signal electrode in the thin film actuated mirrors 101.

Next, each of the thin film electrodisplacive members 55 is heat treated at a high temperature, e.g., for PZT, around 650° C., to allow a phase transition to take place to thereby form an array of M×N heat treated structures (not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed thin film sacrificial layer 24 in the supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65, functions as a mirror as well as a bias electrode in the thin film actuated mirrors 101.

The preceeding step is then followed by completely covering the top surface and the four side surfaces in each of the actuated mirror structures 111 with a thin film protection layer (not shown).

The thin film sacrificial layer 24 in the supporting layer 20 is then removed by using an etching method. Finally, the thin film protection layer is removed to thereby form the array 100 of M×N thin film actuated mirrors 101, as shown in FIG. 1G.

There are certain deficiencies associated with the array 100 of M×N thin film actuated mirrors 101 thus manufactured. The first and foremost is an adhesivity between the thin films constituting each of the actuated mirrors 101. When each of thin film actuated mirror 101 deforms in response to an electric field applied across the thin film electrodisplacive member 55, the first and second thin film electrodes 65, 45 incorporated therein also deform. In the thin film actuated mirrors 101, there is a likelihood of the first thin film electrode 65, the second thin film electrode 45 and the thin film electrodisplacive member 55 delaminating from each other after a prolonged use due to the lack of similarity in the material properties constituting the first and the second thin film electrodes 65 and 45, which are made of a metal, and the thin film electrodisplacive member 55, which is usually made of an electroceramic, e.g., PZT.

Furthermore, a top surface of the thin film electrodisplacive member 55 coming in contact with the first thin film electrode 65 is thermodynamically unstable, and when it is subjected to a high temperature process, islands are formed on a top surface of the thin film electrodisplacive member 55. When the first thin film electrode 65 which also acts as the mirror is formed on such a surface, the resulting mirror surface is not completely flat, affecting the optical efficiency of the thin film actuated mirror 101.

SUMMARY OF THE INVENTION

It is, therefore, a primary object of the present invention to provide an array of M×N thin film actuated mirrors for use in an optical projection system, each of the thin film actuated mirrors having an increased adhesivity between the thin films constituting the actuated mirror and an improved mirror morphology.

It is another object of the present invention to provide a method for the manufacture of such an array of M×N thin film actuated mirrors for use in an optical projection system.

In accordance with one aspect of the present invention, there is provided an array of M×N thin film actuated mirrors, wherein M and N are integers, for use in an optical projection system, the array comprising: an active matrix including a substrate and an array of M×N connecting terminals; an array of M×N actuating structures, each of the actuating structures being provided with a proximal and a distal ends, each of the actuating structures including a first thin film electrode, a barrier member, a thin film electrodisplacive member, a second thin film electrode and an elastic member, wherein the thin film electrodisplacive member is located between the two electrodes, the first thin film electrode is electrically connected to ground, thereby functioning as a common bias electrode as well as a mirror in the thin film actuated mirrors, the second thin film electrode is electrically connected to each of the corresponding connecting terminals, to thereby allow it to function as a signal electrode in each of the thin film actuated mirrors, the barrier member is located between the first thin film electrode and the thin film electrodisplacive member, the second thin film electrode has an ion-damaged top surface, and a bottom portion at the proximal end of each of the actuating structures is attached on top of the active matrix, thereby cantilevering the actuating structure.

In accordance with another aspect of the present invention, there is provided a method for the manufacture of an array of M×N thin film actuated mirrors, wherein M and N are integers, for use in an optical projection system, the method comprising the steps of: providing an active matrix including a substrate and an array of M×N connecting terminals; depositing a passivation layer on top of the active matrix; depositing an etchant stopping layer on top of the passivation layer; depositing a thin film sacrificial layer on top of the etchant stopping layer; creating an array of M×N empty cavities in the thin film sacrificial layer, each of the empty cavities encompassing one of the connecting terminals; depositing an elastic layer on top of the thin film sacrificial layer including the empty cavities; forming an array of M×N pairs of conduits; forming a second thin film layer on top of the elastic layer including the conduits; damaging a top surface of second thin film layer; depositing a thin film electrodisplacive layer on top of the damaged top surface of the second thin film layer; forming a barrier layer on top of the thin film electrodisplacive layer; depositing a first thin film layer on top of the barrier layer to thereby form a multiple layered structure; patterning the multiple layered structure to form an array of M×N actuating structures; and removing the thin film sacrificial layer to thereby form an array of M×N thin film actuated mirrors.

BRIEF DESCRIPTION OF THE DRAWINGS

The above and other objects and features of the present invention will become apparent from the following description of the preferred embodiments, when given in conjunction with the accompanying drawings, wherein.

DETAILED DESCRIPTION OF THE PREFERRED EMBODIMENTS

Figure 1A:
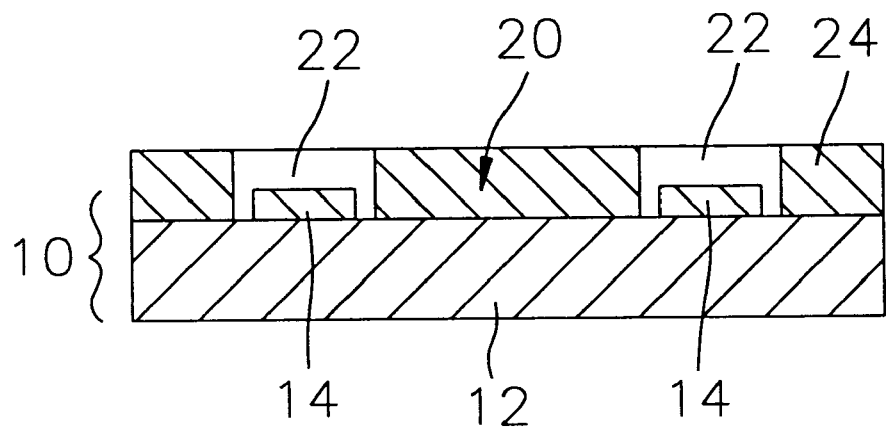
FIGS. 1A to 1G depict schematic cross sectional views illustrating a method for the manufacture of an array of M×N thin film actuated mirrors previously disclosed.
Figure 1B:
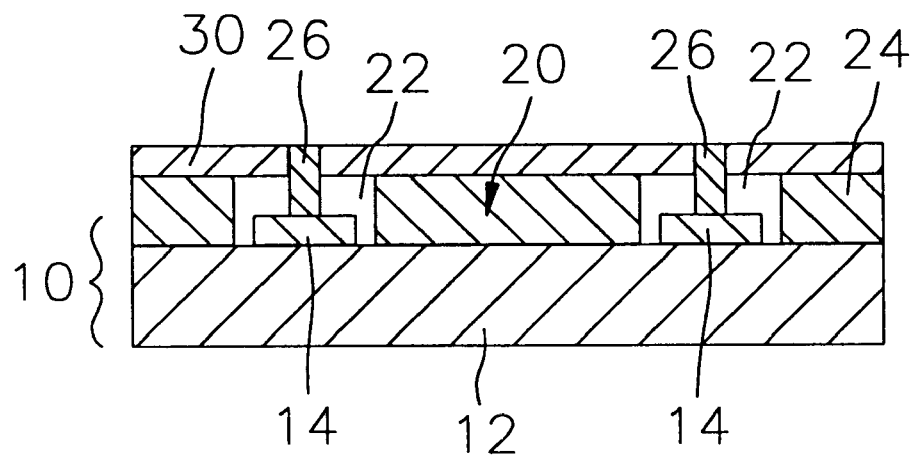
Figure 1C:
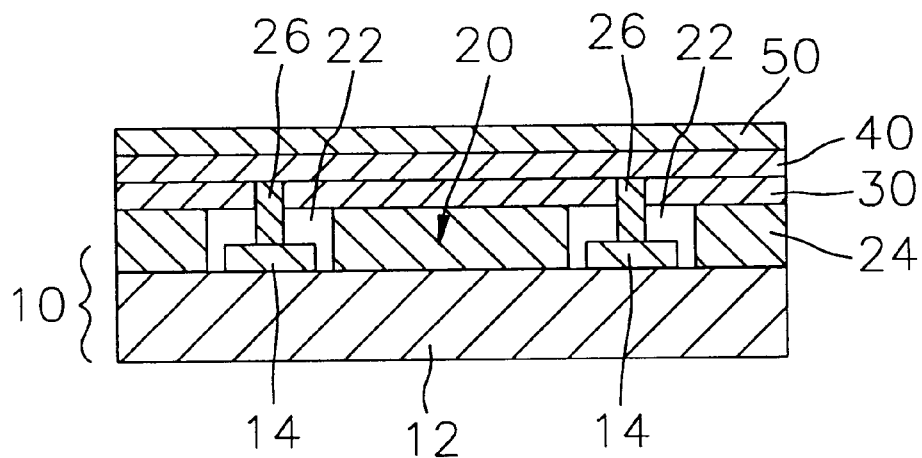
Figure 1D:
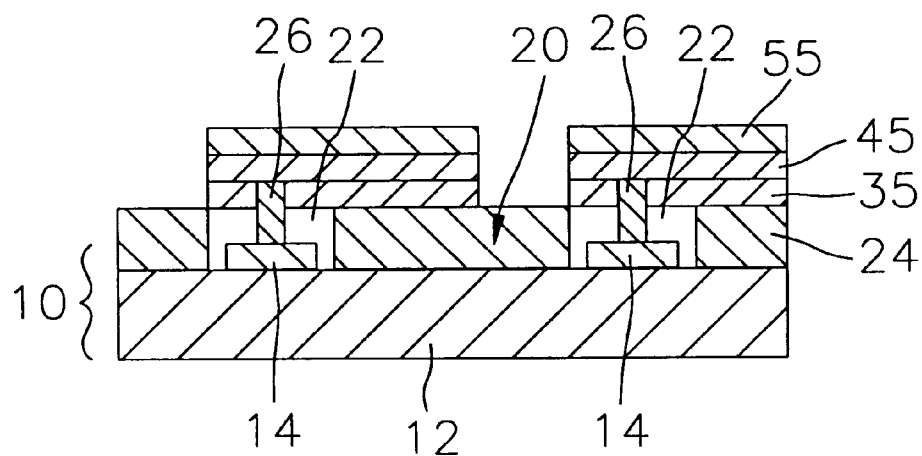
Figure 1E:
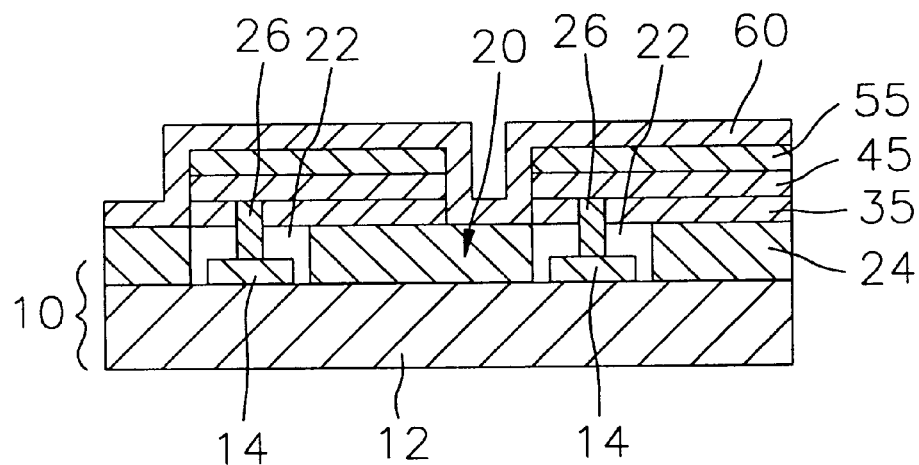
Figure 1F:
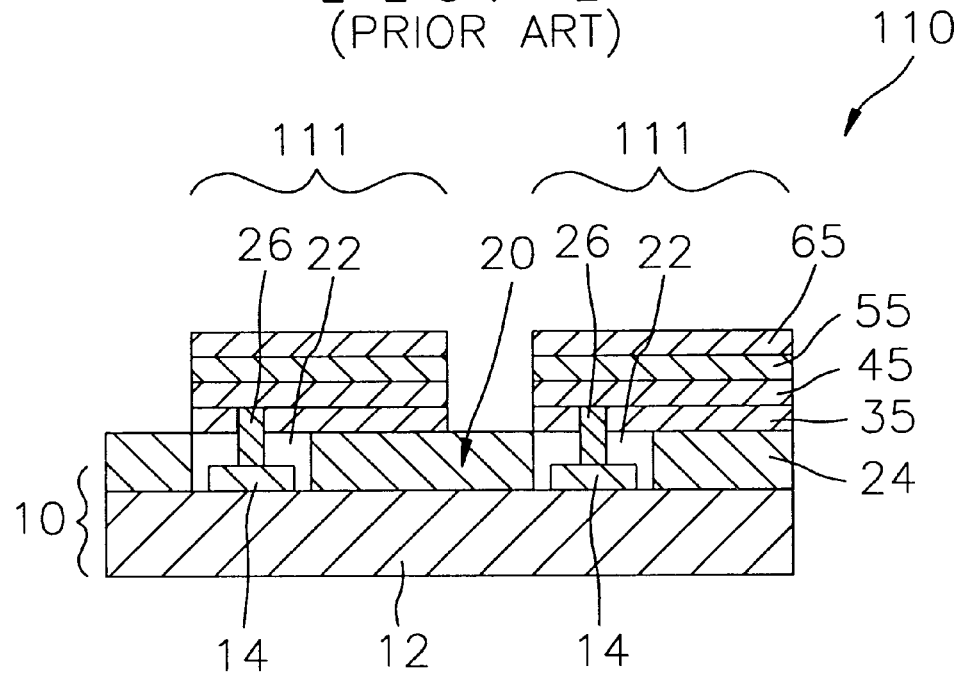
Figure 1G:
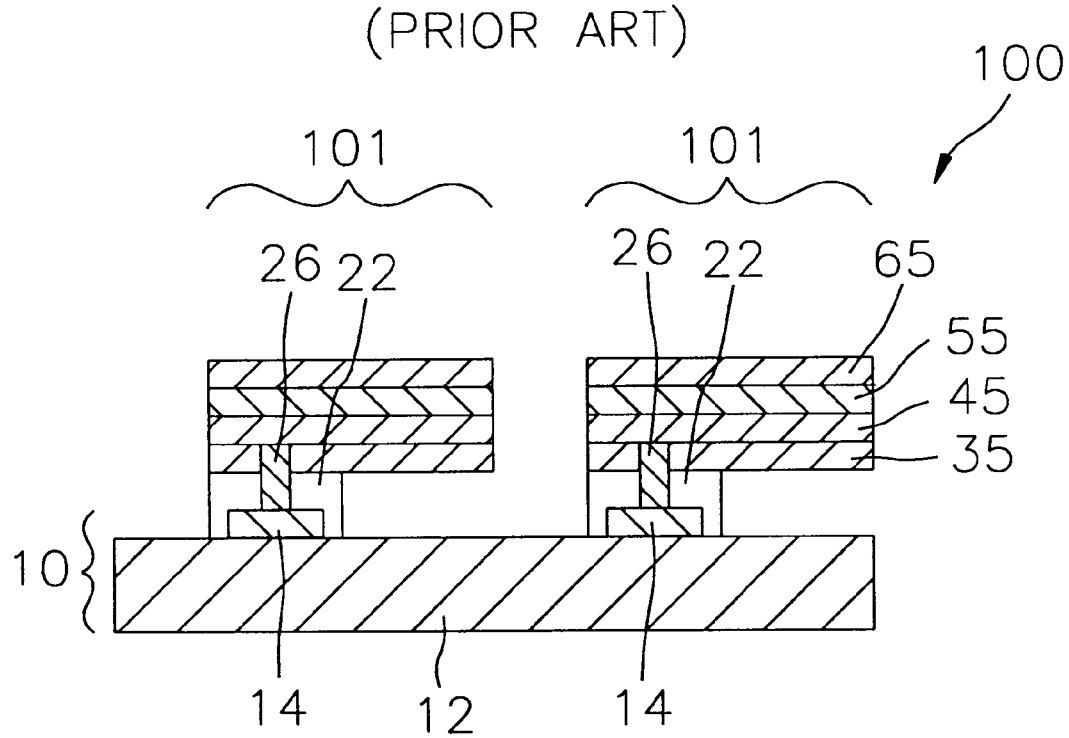

There are provided in FIGS. 2 and 3A to 3J schematic cross sectional views setting forth an array 300 of M×N thin film actuated mirrors 301 and a method for the manufacture thereof, respectively, wherein M and N are integers, for use in an optical projection system, in accordance with the present invention. It should be noted that like parts appearing in FIGS. 2 and 3A to 3J are represented by like reference numerals.

Figure 2:
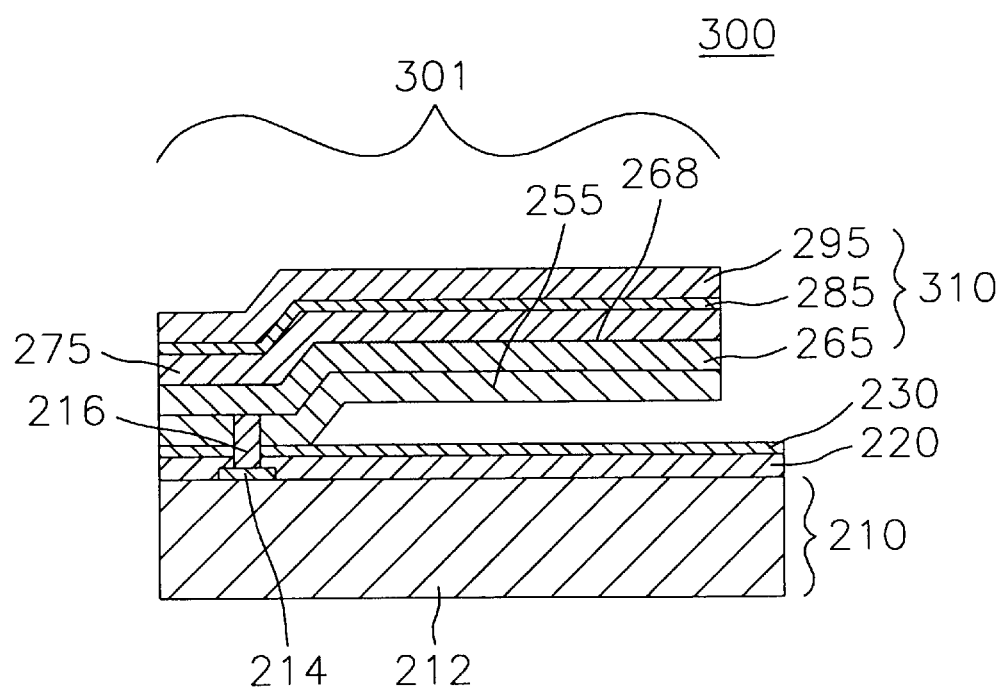
FIGS. 2 presents schematic cross sectional view illustrating an array of M×N thin film actuated mirrors for use in an optical projection system in accordance with a preferred embodiment of the present invention.

In FIG. 2, there is produced a cross sectional view of an array 300 of M×N thin film actuated mirrors 301 in accordance with the present invention, the array 300 comprising an active matrix 210, a passivation layer 220, an etchant stopping layer 230 and an array 310 of M×N actuating mirror structures.

The active matrix 210 has a substrate 212 and an array of M×N transistors (not shown) and an array of M×N connecting terminals 214, each of connecting terminals 214 is electrically connected to a corresponding transistor in the array of M×N transistors.

The passivation layer 220, made of, e.g., phosphor-silicate glass (PSG) or silicon nitride, and having a thickness of 0.1–2 $\mu$m, is located on top of the active matrix 210.

The etchant stopping layer 230, made of a nitride, and having a thickness of 0.1–2 $\mu$m, is positioned on top of the passivation layer 220.

Each of the actuating structures 310 is provided with a proximal and a distal ends, and includes a first thin film electrode 295, a barrier member 285 made of fine oxide, e.g., silicon dioxide (SiO$_2$), a thin film electrodisplacive member 275 made of a piezoelectric or an electrostrictive material, a second thin film electrode 265 and a elastic member 255. The thin film electrodisplacive member 275 is located between the two electrodes 295,265, the first thin film electrode 295 is electrically connecting to ground, thereby functioning as a common bias electrode as well as a mirror in the thin film actuated mirrors 301, the second thin film electrode 265 is electrically connected to each of the corresponding connecting terminals 214, to thereby allow it to function as a signal electrode in each of the thin film actuated mirrors 301, the barrier member 285 is located between the first thin film electrode 295 and the thin film electrodisplacive member 275, a bottom portion at the proximal end of each of the actuating structures 310 mirror structures 301 is attached on top of the active matrix 210, thereby cantilevering each of the actuating structures 310

In FIGS. 3A to 3J, there are presented cross sectional views setting forth a method for manufacturing an array 300 of M×N thin film actuated mirrors 301 in accordance with a preferred embodiment of the present invention.

The process for the manufacture of the array 300 begins with the preparation of an active matrix 210 including a substrate 212 with an array of M×N transistors (not shown) and an array of M×N connecting terminals 214.

In a next step, there is deposited a passivation layer 220, made of, e.g., PSG or silicon nitride, and having a thickness of, e.g., 0.1–2 μm, on top of the active matrix 210 by using, e.g., a CVD or a spin coating method.

Figure 3A:
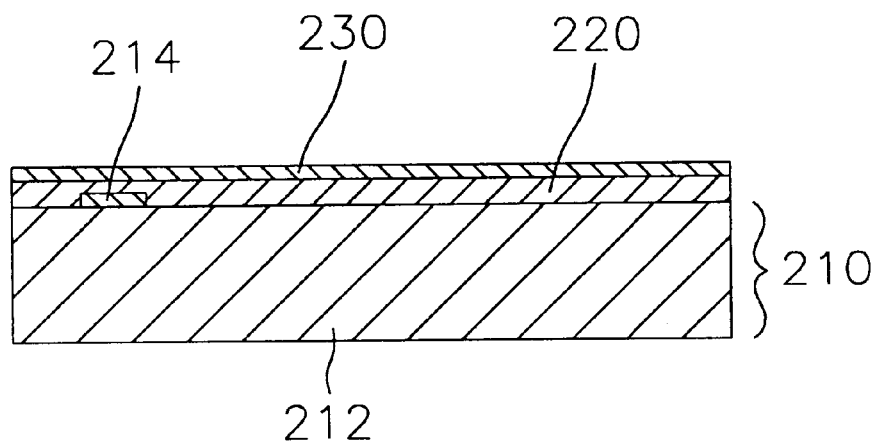
FIGS. 3A to 3J are schematic cross sectional views setting forth a method for the manufacture of an array of M×N thin film actuated mirrors in accordance with the present invention.

Thereafter, an etchant stopping layer 230, made of a nitride, and having a thickness of 0.1–2 μm, is deposited on the passivation layer 230 by using, e.g., a sputtering or a CVD method, as shown in FIG. 3A.

In a subsequent step, there is formed on top of the etchant stopping layer 230 a thin film sacrificial layer 240, having a thickness of 0.1–2 μm, and made of a metal, e.g., copper (Cu) or nickel (Ni), a phosphor-silicate glass (PSG) or a poly-Si. The thin film sacrificial layer 240 is formed by using a sputtering or an evaporation method if the thin film sacrificial layer 240 is made of a metal, a chemical vapor deposition (CVD) method or a spin coating method if the thin film sacrificial layer 240 is made of a PSG, or a CVD method if the thin film sacrificial layer 240 is made of a poly-Si.

Figure 3B:
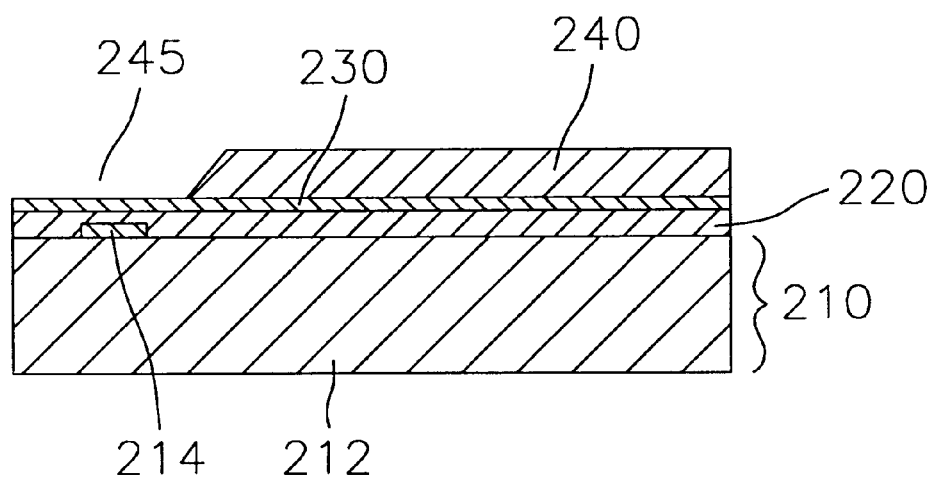

Then, there is formed an array of M×N empty cavities 245 in the thin film sacrificial layer 240 by using an etching method. Each of the empty cavities 245 encompasses one of the connecting terminals 214, as shown in FIG. 3B.

In a following step, an elastic layer 250, made of an insulating material, and having a thickness of 0.1–2 μm, is deposited on top of the thin film sacrificial layer 240 including the empty cavities 245 by using a CVD method.

Figure 3C:
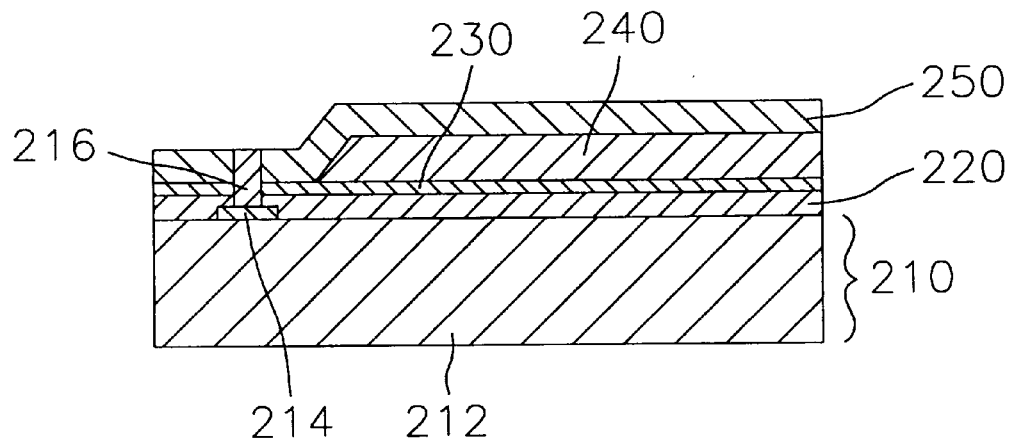

Next, there is formed an array of M×N conduits 216 made of a metal in the elastic layer 250. Each of the conduits 216 is formed by: first creating an array of M×N holes (not shown), each of the holes extending from top of the elastic layer 250 to top of the connecting terminal 214 by using an etching method; and filling therein with the metal by using, e.g., a lift-off method, as shown in FIG. 3C.

Figure 3D:
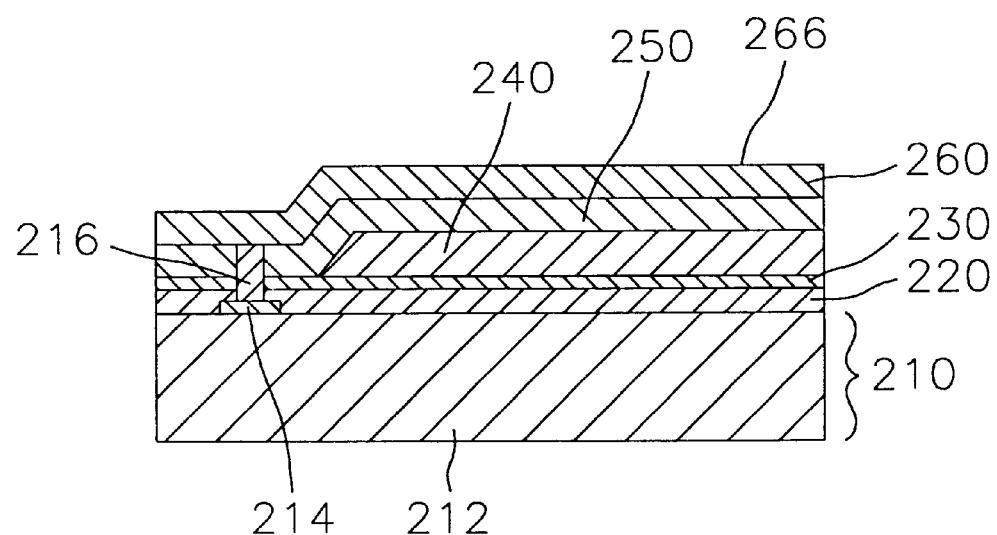

Subsequently, a second thin film layer 260 made of an electrically conducting material, e.g., Platinum (Pt), and having a thickness of, e.g., 0.1–2 μm, is deposited on top of the elastic layer 250 by using a sputtering or a vacuum evaporation method, as shown in FIG. 3D. The second thin film layer 260 has a top surface 266 thereof.

Figure 3E:
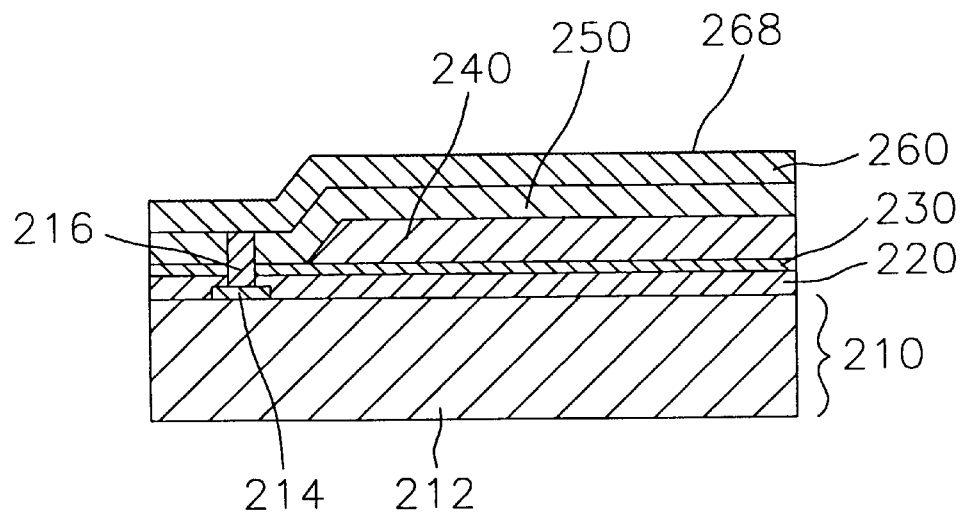

The top surface 266 of the second thin film layer 260 is then damaged with an inert ion-beam, e.g., Argon, having high energy, e.g., a power of KeV, to thereby form a ion-damaged surface 268, as shown in FIG. 3E.

Figure 3F:
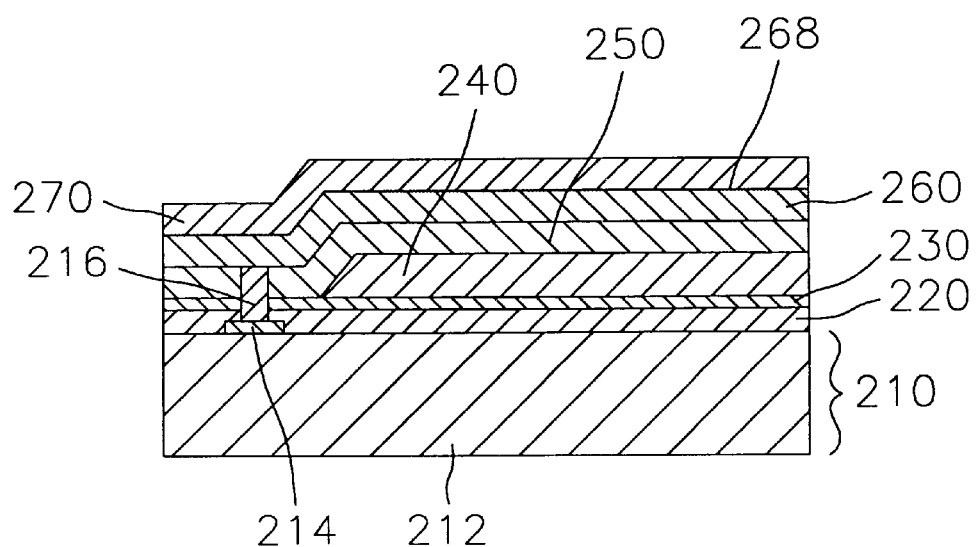

In an ensuing step, a thin film electrodisplacive layer 270, made of a piezoelectric or an electrostrictive material, and having a thickness of 0.1–2 μm, is formed on top of the ion-damaged surface 268 of the second thin film layer 260 by using a CVD method, an evaporation method, a Sol-Gel method or a sputtering method. The ion-damaged surface 268 of the second thin film layer 260 has high surface energy to thereby allow the thin film electrodisplacive layer 270 to be easily formed on top of the ion damaged surface 268. The thin film electrodisplacive layer 270 is then heat treated to allow a phase transition to take place, as shown in FIG. 3F.

Figure 3G:
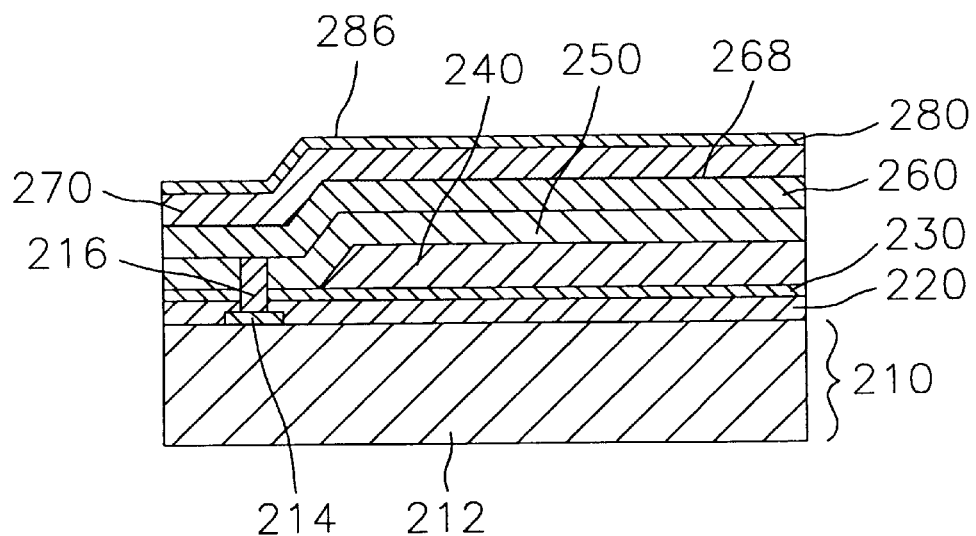

In a subsequent step, a barrier layer 280 made of fine oxide, e.g., silicon dioxide (SiO2), and having a thickness of less than 100 Å, is formed on top of the thin film electrodisplacive layer 270 by using one of a sputtering, vacuum evaporation or PECVD method, as shown in FIG. 3G. The barrier layer 280 has a planar top surface 286.

Figure 3H:
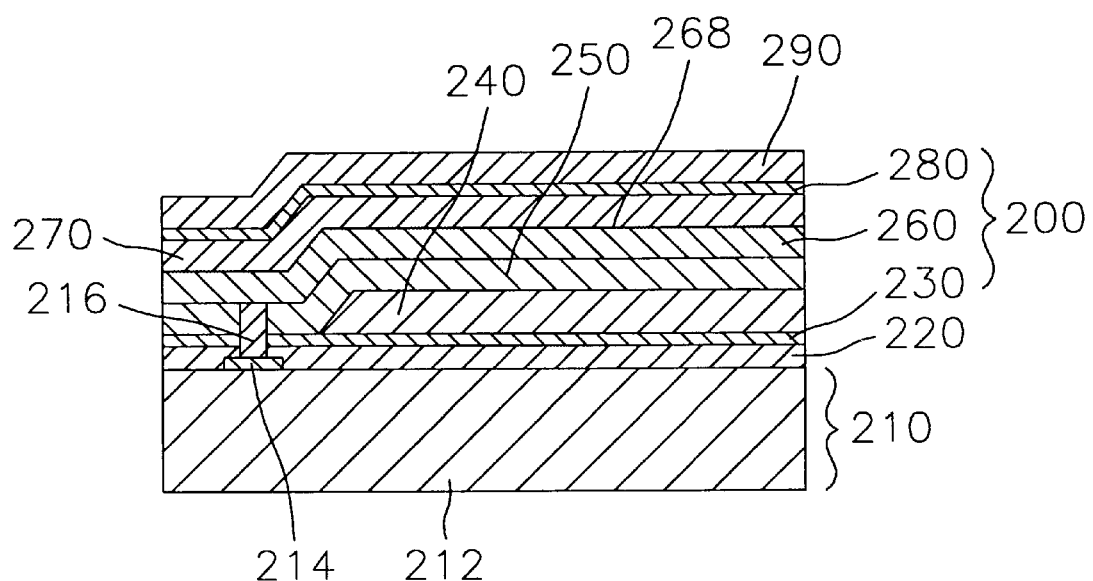

In an ensuing step, a first thin film layer 290 made of an electrically conducting and light reflecting material, and having a thickness of 0.1–2 μm, is deposited on top of the barrier layer 280 by using a sputtering or a vacuum evaporation method, to thereby form a multiple layered structure 200, as shown in FIG. 3H.

Figure 3I:
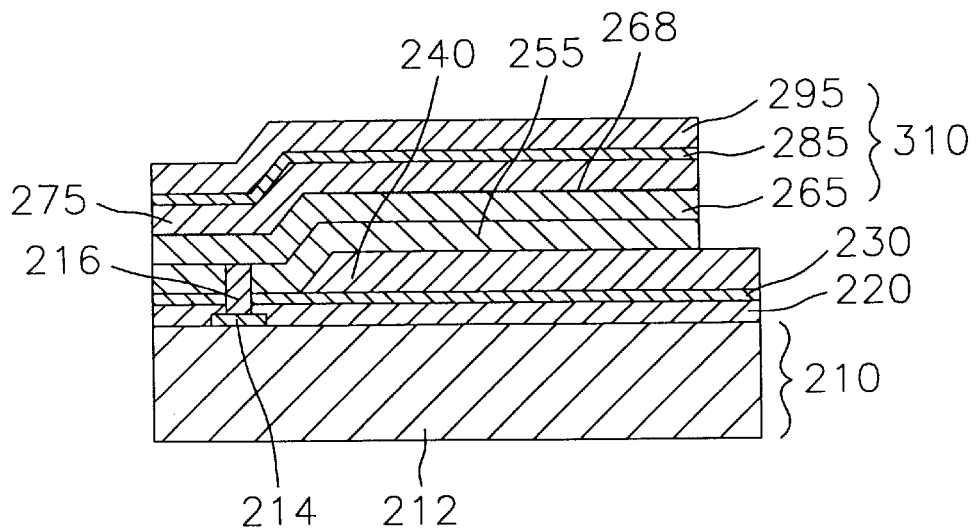

After the above step, the multiple layered structure 200 is patterned, until the thin film sacrificial layer 240 is exposed, by using a photolithography or a laser trimming method, thereby forming an array of M×N actuating structures 310, each of the actuating structures 310 including a first thin film electrode 295, a barrier member 285, a thin film electrodisplacive member 275, a second thin film electrode 265, an elastic member 255 and the conduit 216, as shown in FIG. 3I. The second thin film electrode 265 is electrically connected to the connecting terminal 214 through the conduit 216, thereby functioning as a signal electrode. The first thin film electrode 295 functions as a mirror as well as a common bias electrode.

The preceeding step is then followed by completely covering each of the actuating structures 810 with a thin film protection layer (not shown).

The thin film sacrificial layer 240 is then removed by using a etchant, e.g., hydrogen fluoride (HF).

Figure 3J:
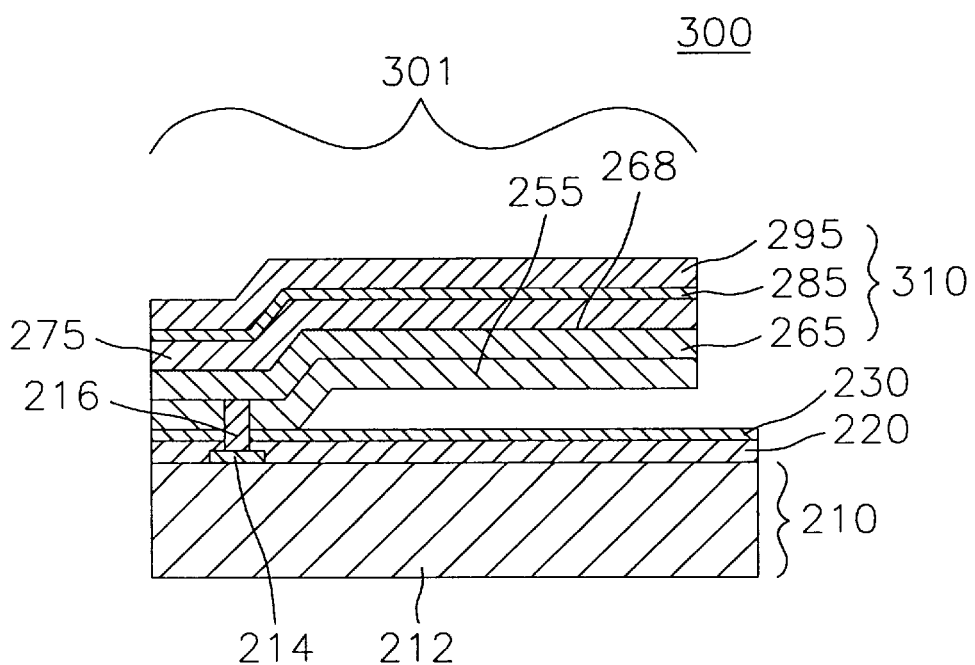

Finally, the thin film protection layer is removed by using a dry etching method, e.g., a plasma etching method to thereby form an array of M×N thin film actuated mirrors, as shown in FIG. 3J.

It should be mentioned that, even though, the array 300 of M×N thin film actuated mirrors 301 and the method for manufacturing thereof described with respect to the case wherein, in order to provide an increased adhesivity between thin films constituting each of the actuating structures 310, the barrier layer 280 is placed on top of the thin film electrodisplacive layer 270 and the top surface 266 of second thin film layer 260 is ion-damaged by using an ion beam.

Furthermore, in order to provide an improved mirror morphology and hence as increased optical efficiency, the first thin film layer 290 functioning as a mirror is formed on top of the barrier layer 280.

While the present invention has been described with respect to certain preferred embodiments only, other modifications and variations may be made without departing from the spirit and scope of the present invention as set forth in the following claims.

What is claimed is:

1. An array of M×N thin film actuated mirrors, the array comprising:

an active matrix including a substrate and an array of M×N connecting terminals; and an array of M×N actuating structures, each of the actuating structures being provided with a proximal and a distal end, each of the actuating structures including a first thin film electrode, a barrier member, a thin film electrodisplacive member, a second thin film electrode and an elastic member, wherein the thin film electrodisplacive member is located between the two electrodes, the barrier member is located between the first thin film electrode and the thin film electrodisplacive member, and the second thin film electrode is between the thin film electrodisplacive member and the elastic member, which is placed on bottom surface of second thin film electrode, the second thin film electrode has an ion-damaged top surface, and a bottom portion at the proximal end of each of the actuating structures is attached on top of the active matrix, thereby cantilevering each of the actuating structures.

2. The array of claim 1, wherein the active matrix further includes a passivation layer and an etchant stopping layer located on top surface thereof, successively.

3. The array of claim 1, wherein the barrier member is made of an oxide.

4. The array of claim 3, wherein the oxide includes silicon dioxide ($SiO_2$).

5. A method for manufacturing an array of M×N thin film actuated mirrors comprising the steps of:

providing an active matrix including a substrate and an array of M×N connecting terminals;

forming a thin film sacrificial layer on top of the active matrix, wherein the thin film sacrificial layer includes an array of M×N empty cavities encompassing the connecting terminals;

forming a elastic layer on top of the thin film sacrificial layer including the empty cavities;

forming a second thin film layer on top of the elastic layer;

damaging a top surface of the second thin film layer with an ion-beam;

depositing a thin film electrodisplacive layer, a barrier layer and a first thin film layer, respectively, on top of the damaged top surface of the second thin film layer;

patterning the layers thereby forming an array of M×N actuating structures; and removing the thin film sacrificial layer.

6. The method of claim 5 further comprising a step of depositing a passivation layer on top of the active matrix before the step of forming the thin film sacrificial layer.

7. The method of claim 6 further comprising a step of depositing an etchant stopping layer on top of the passivation layer before the step of forming the thin film sacrificial layer.

8. The method of claim 5, wherein the ion-beam is made of an inert gas.

9. The method of claim 5, wherein the barrier layer is made of silicon dioxide ($SiO_2$).

10. The method of claim 9, wherein the barrier layer has a thickness less than 100 Å.

11. The method of claim 10, wherein the barrier layer is deposited by using a sputtering, vacuum evaporation or PECVD method.

12. The method of claim 5 further comprising the step of forming an array of M×N conduits in the elastic layer.

13. A method for manufacturing an array of M×N thin film actuated mirrors comprising the step of:

providing an active matrix including a substrate and an array of M×N connecting terminals;

depositing a thin film sacrificial layer on top of the active matrix;

etching the thin film sacrificial layer, selectively, to expose the connecting terminals, thereby forming an array of M×N empty cavities in the sacrificial layer;

depositing an elastic layer on top of the sacrificial layer and the empty cavities, wherein the elastic layer is partially attached on top of the active matrix;

depositing a second thin film layer on top of the elastic layer;

damaging a top surface of the second thin film layer by with an ion-beam;

depositing a thin film electrodisplacive layer on top of the damaged top surface of the second thin film layer;

depositing a barrier layer on top of the thin film electrodisplacive layer;

depositing a first thin film layer on top of the barrier layer;

patterning the first thin film layer, the barrier layer, the thin film electrodisplacive layer, the second thin film layer and the elastic layer into the first thin film electrode, the barrier member, the thin film electrodisplacive member, the second thin film electrode and the elastic member, respectively, to expose the thin film sacrificial layer, thereby forming an array of M×N actuating mirror structures;

removing the sacrificial layer to cantilevering each of the actuating mirror structures from the active matrix, thereby forming the array of M×N thin film actuated mirrors.

14. The method of claim 13 further comprising a step of forming an array of M×N conduits in the elastic layer before the step of depositing a second thin film layer, wherein each of the conduits extends from top of the elastic layer to top of a corresponding connecting terminal.

* * * * *